April 26, 1960  A. J. McCLELLAND  2,933,936
MACHINE TOOL TRANSMISSION CONTROL SYSTEM
Filed Oct. 8, 1958  8 Sheets-Sheet 1

INVENTOR.
ALEXANDER J. McCLELLAND
BY Hudson, Boughton,
Williams, David & Hoffmann
ATTORNEYS April 26, 1960 A. J. McCLELLAND 2,933,936
MACHINE TOOL TRANSMISSION CONTROL SYSTEM
Filed Oct. 8, 1958 8 Sheets-Sheet 5
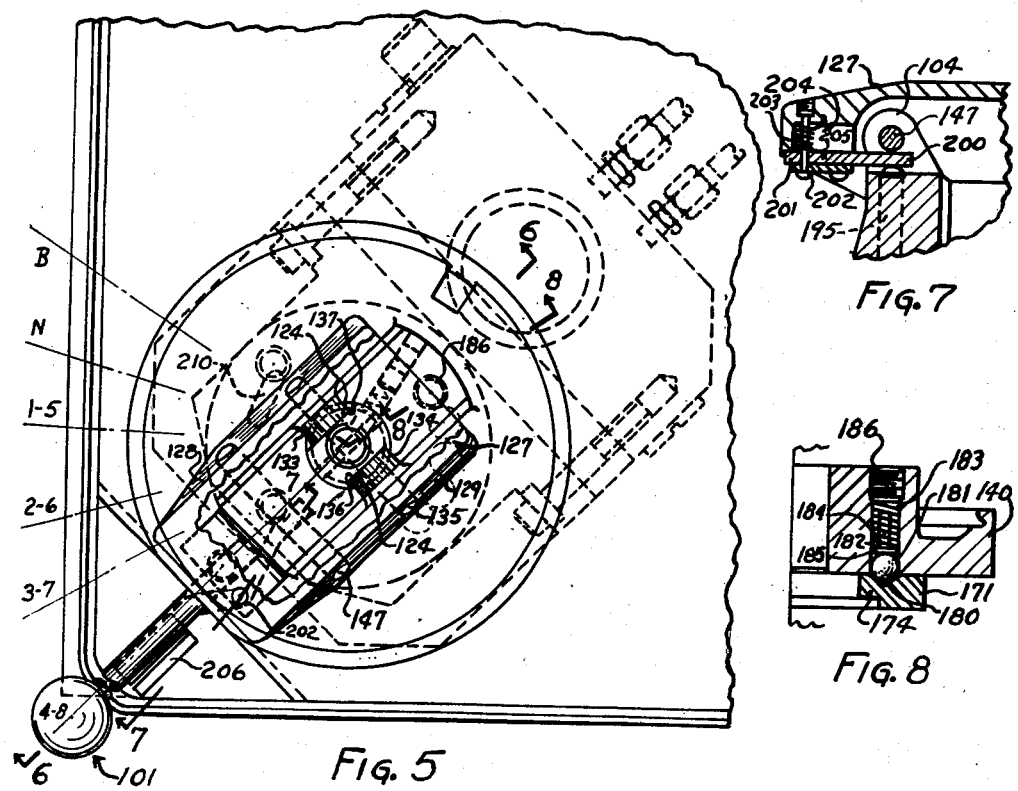
FIG. 5
FIG. 7
FIG. 8
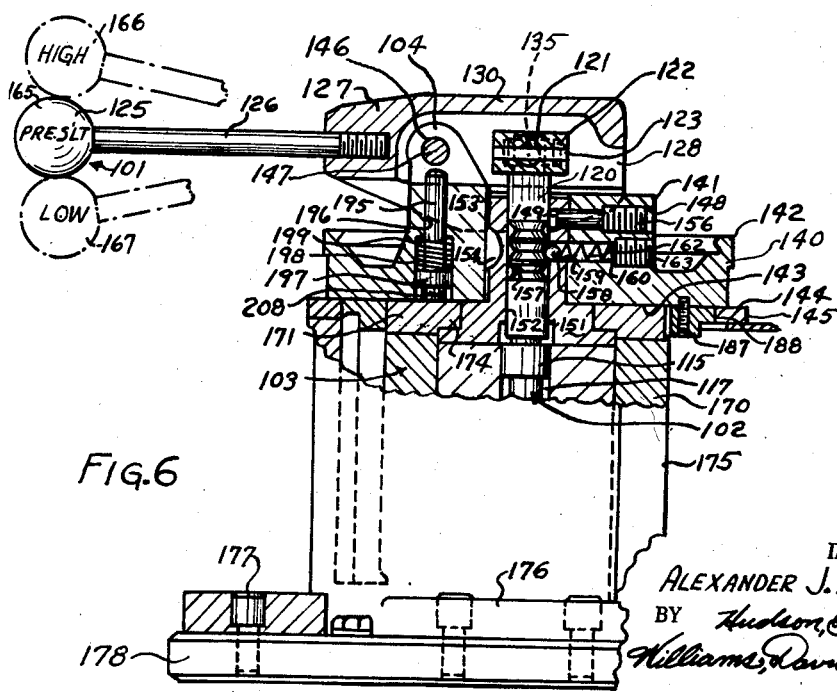
FIG. 6
INVENTOR.
ALEXANDER J. McCLELLAND
BY Hudson, Boughton,
Williams, David & Hoffmann
ATTORNEYS

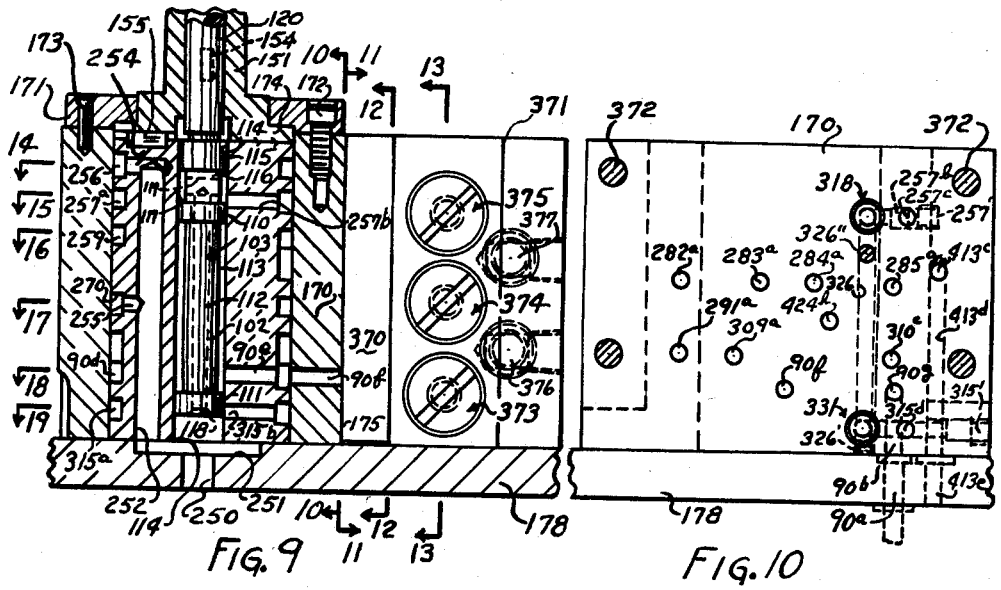
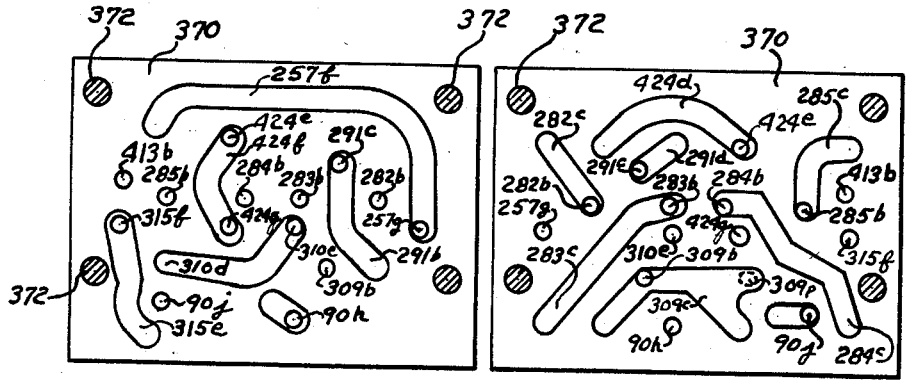
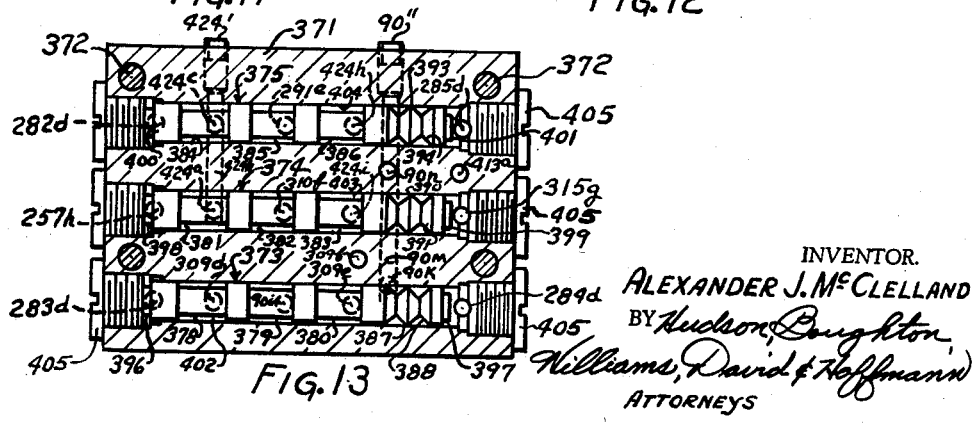

April 26, 1960     A. J. McCLELLAND     2,933,936
MACHINE TOOL TRANSMISSION CONTROL SYSTEM
Filed Oct. 8, 1958     8 Sheets-Sheet 8
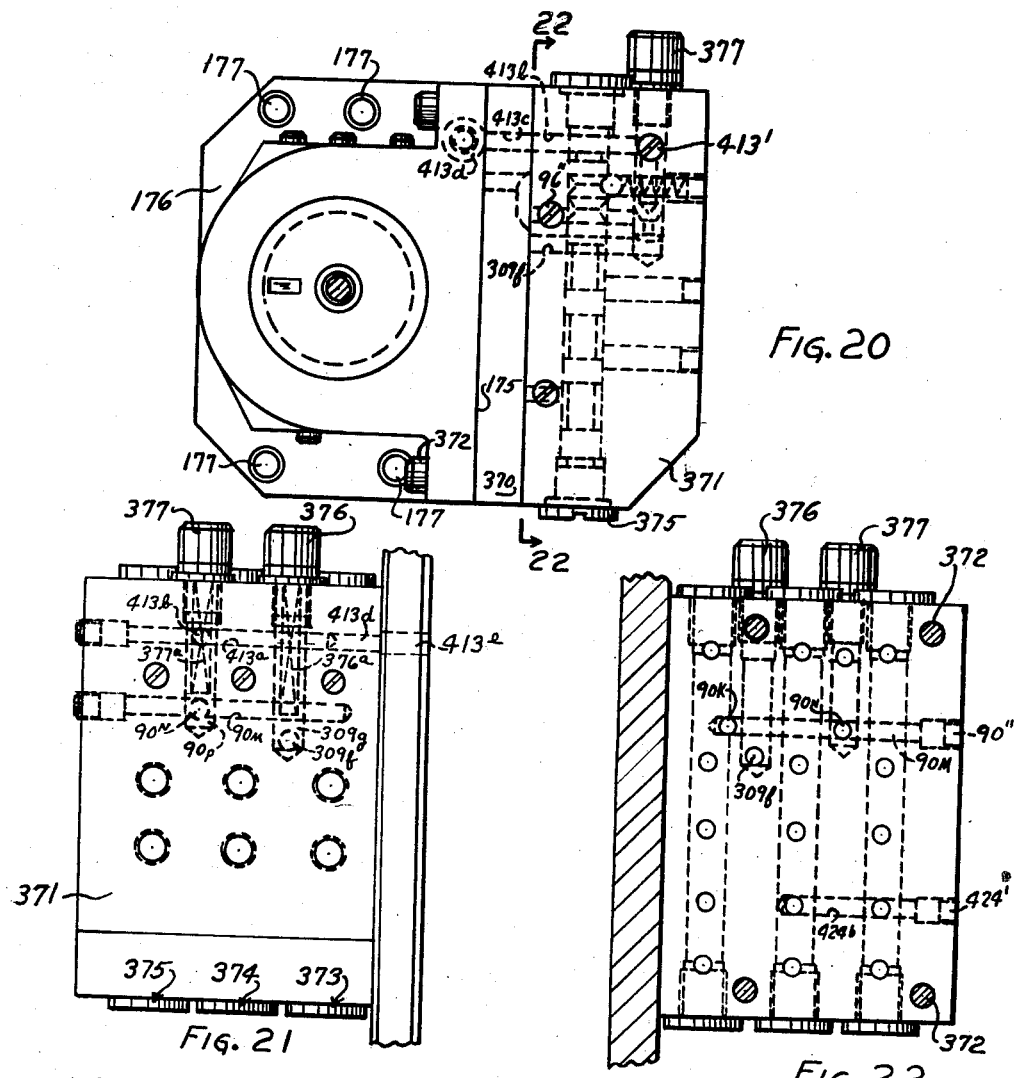
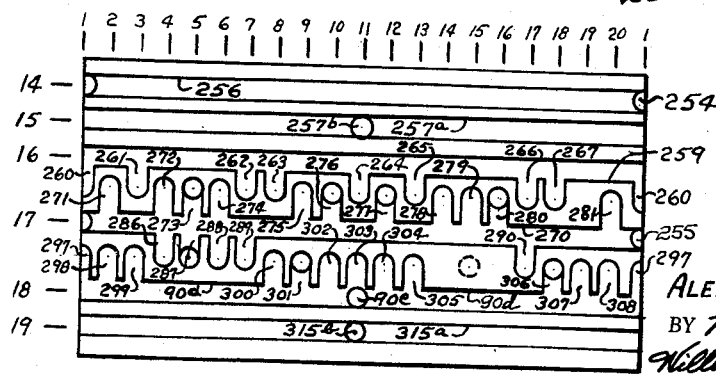
INVENTOR.
ALEXANDER J. McCLELLAND
BY Hudson, Boughton
Williams, David & Hoffmann
ATTORNEYS

United States Patent Office 2,933,936
Patented Apr. 26, 1960

2,933,936

MACHINE TOOL TRANSMISSION CONTROL SYSTEM

Alexander J. McClelland, Cleveland, Ohio, assignor to The Warner & Swasey Company, Cleveland, Ohio, a corporation of Ohio Application October 8, 1958, Serial No. 766,047

12 Claims. (Cl. 74—364)

The present invention relates to a control for a change speed transmission particularly adapted to be used in the headstock of a machine tool. It will be understood that the transmission and the control therefor are susceptible of use in other types of apparatus or machinery.

An object of the present invention is to provide a new and improved control system, and a control apparatus therefor, for a change speed transmission particularly adapted to be used in the headstock of a machine tool and capable of imparting a relatively large number of different speeds to the spindle or driving member but which control apparatus is suitable for a transmission that is compact, utilizes relatively short shafts and permits the overall size of the headstock or transmission housing to be maintained at a minimum.

A further object of the invention is to provide improved means in a transmission for a headstock of a machine tool referred to, for effecting speed changes quietly while under load and for effecting the braking of the spindle, together with improved controls for the means effecting the speed changes.

A still further object of the present invention is to provide novel control means for the transmission referred to in the preceding objects such that during spindle rotation at a certain speed in one operative step of the work cycle a different spindle speed can be preselected for the next operative step and then readily obtained at the end of the one operative step.

Another object of the present invention is to provide, in the transmission referred to, improved control means wherein a handle may be angularly moved to any one of a plurality of angularly-spaced preselect positions without effecting a speed change, the handle being movable to a plurality of positions while in any one of the preselect positions for selecting one of several speeds.

Further and additional objects and advantages not hereinbefore referred to will become apparent hereinafter during the detailed description of a preferred embodiment of the invention which is to follow and which embodiment is illustrated in the accompanying drawings, wherein:

Fig. 5 is a plan view of the control valve in preselected position 4—8;

Fig. 6 is a sectional view of the main control valve along section line 6—6 of Fig. 5 with parts thereof in elevation;

Fig. 7 is a fragmentary sectional view of a detail of the main control valve along section line 7—7 in Fig. 5;

Fig. 8 is a fragmentary sectional view of the main control valve along section line 8—8 in Fig. 5;

Fig. 9 is a vertical sectional view of the main control valve with the control lever removed and showing the relative positions of the control ducts therein when the valve is in brake position;

Figure 1:
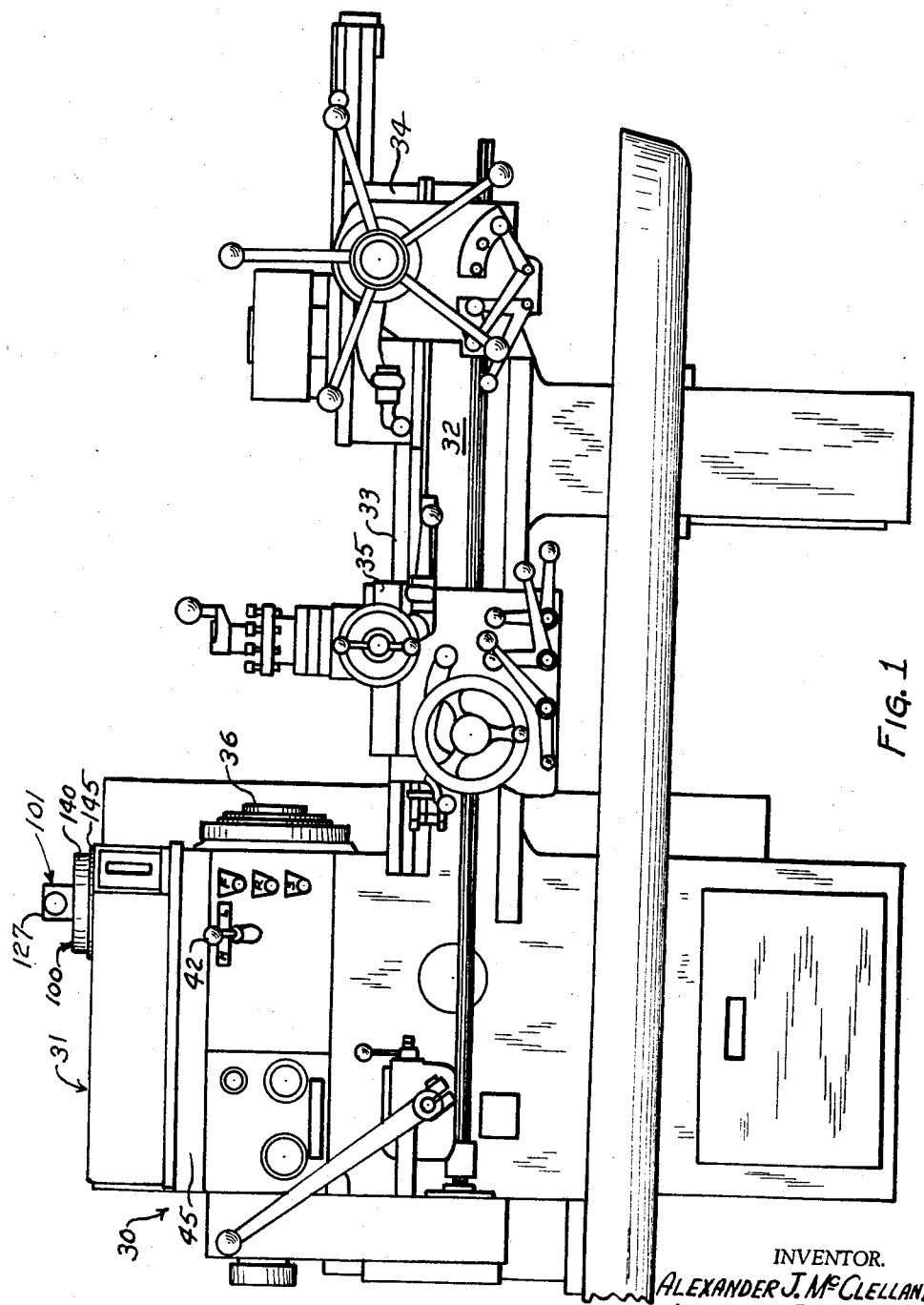
Fig. 1 is a fragmentary front elevational view of a machine tool showing the headstock thereof in which is used a change speed transmission embodying the invention.

Figs. 10, 11, 12, 13, 14, 15, 16, 17, 18 and 19 are cross-sectional views of the main control valve assembly taken along section lines 10—10, 11—11, 12—12, 13—13, 14—14, 15—15, 16—16, 17—17, 18—18 and 19—19, respectively, of Fig. 9 when the valve is in brake position;

Fig. 20 is a plan view of the main control valve shown in Figs. 5 and 6 but with the control lever and certain parts thereof removed;

Fig. 21 is an end elevational view along section line 21—21 in Fig. 20;

Fig. 22 is a sectional view along line 22—22 in Fig. 20;

Fig. 23 is a diagrammatic view showing a developed layout of the control grooves, apertures and ducts of the main control valve for controlling the transmission; and Fig. 24 is a chart showing which transmission clutches are energized in order to brake the spindle, to put the transmission in neutral so that the spindle can be freely turned by hand, and to select or preselect the eight transmission speeds, and describes the corresponding positions of the control lever to obtain the same.

It is to be understood that the invention is not limited to the details of construction and arrangements of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

The present invention is shown adapted to control an eight speed transmission, preferably in a machine tool, for the purpose of illustrating the invention. The transmission has five shafts, including a spindle shaft, on which six clutches and fourteen gears are mounted.

A drive for the transmission is preferably comprised of a two speed, reversible electric motor and provides, in conjunction with the eight speed transmission, sixteen spindle speeds in the forward and reverse directions.

A novel hydraulic speed control or gear shift mechanism is used to control the transmission. This mechanism includes three shiftable hydraulic, two-position clutch control members or shuttle valves. A first shuttle valve controls a pair of clutches, designated as a left hand clutch and a right hand clutch, on a second transmission shaft. A second shuttle valve controls a left hand clutch and a right hand clutch on a third transmission shaft. A third shuttle valve controls a left hand clutch on a fourth transmission shaft and a right hand clutch on a fifth transmission, or spindle shaft. The electric motor directly drives the first transmission shaft.

Figure 4:
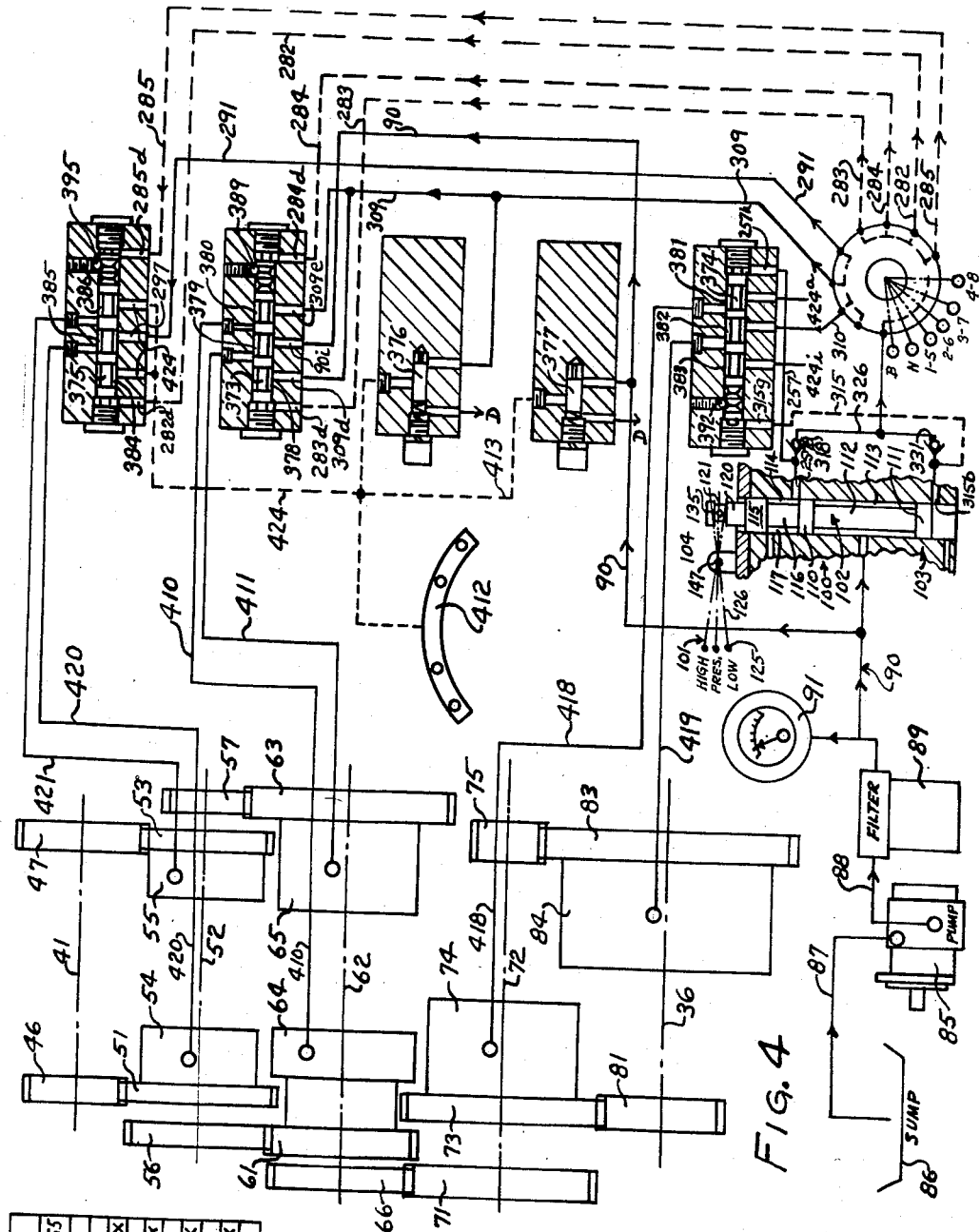
Fig. 4 is a diagrammatic view of the change speed transmission shown in Figs. 2 and 3 and of the hydraulic control mechanism for the transmission and which control mechanism includes a speed control spool valve and a rotary selector or main control valve.

The shuttle valves serve to control the clutches, Fig. 4, depending upon the relative positions of the former. For example, upon shifting the first shuttle valve to the left, the right hand clutch on the second transmission shaft is actuated by feeding pressure fluid thereto by way of a clutch pressure line up to the shuttle valve and a feed line to the left hand clutch. On shifting the first shuttle valve to the right, the left hand clutch on the second transmission shaft is actuated by way of the clutch pressure line up to the shuttle valve and a feed line to the clutch. The first shuttle valve is shifted by selectively feeding pressure fluid through pilot pressure lines to either end of the first shuttle valve, the second and third shuttle valves being shifted in a similar manner.

Upon shifting the second shuttle valve to the left, the right hand clutch on the third transmission shaft is actuated by feeding pressure fluid thereto, by way of a clutch pressure line up to the shuttle valve and a lead line to the clutch. The left hand clutch on the third transmission shaft is actuated by shifting the second shuttle valve to the right by feeding pressure fluid thereto by way of a clutch pressure line up to the shuttle valve and a left hand clutch lead line to the left hand clutch. When the second shuttle valve is in a position to supply pressure fluid to one of the clutches controlled thereby it, for all positions of the control handle except brake and neutral positions, connects the other clutch to drain.

For purpose of braking, both clutches controlled by the second shuttle valve are engaged. This is accomplished by supplying fluid pressure to the ducts that ordinarily serve as drain lines so that the clutch pressure line, which is usually connected to drain for the particular position of the second shuttle valve, is supplied with fluid pressure to engage the corresponding clutch. This causes both the left hand clutch and the right hand clutch on the third transmission shaft to be actuated with the consequent braking of the third shaft caused by a locking of the associated gears thereon. The brake is effected since the gears on the opposite ends of the second shaft are driven in opposite directions from gears on the first shaft.

The third shuttle valve controls the left hand clutch and the right hand clutch on the fourth transmission shaft and the fifth or spindle shaft, respectively, there being only one clutch on each of the shafts.

When both of the clutches on the fourth and spindle shafts are disengaged, the transmission is in neutral or preselect.

When the clutch on the fourth transmission shaft is engaged and the clutch on the spindle shaft is disengaged, the transmission is in the high speed range. The clutch on the fourth shaft is engaged when the third shuttle valve has been shifted to the right for permitting the supply of pressure fluid to a lead line connected to the clutch from a clutch pressure line connected to the shuttle valve.

When the clutch on the spindle shaft, i.e., the right hand clutch, is engaged and the clutch on the fourth shaft is disengaged, the transmission is in the low speed range. The clutch on the spindle shaft is actuated by shifting the third shuttle valve to the left for permitting the supply of fluid through a lead line from a clutch pressure line connected to the third shuttle valve.

The gear shift mechanism for controlling the transmission is provided with a hand operated speed control or gear shift lever angularly movable to a brake position, a neutral position, and four preselect speed positions. Upon tilting the lever upwardly in any of the four preselect positions, the clutch on the fourth shaft is engaged enabling a high speed to be obtained for each preselect position; and, on tilting the lever downwardly, the clutch on the spindle shaft is engaged enabling a low speed to be obtained for each preselect position.

The gear shift lever controls a three position, vertically shiftable spool valve concentrically disposed in a rotary selector valve, the latter being enclosed in a valve sleeve having a plurality of pickoff ports for selectively controlling the shuttle valves and selectively energizing the six clutches. The three positions of the spool valve are high, neutral or preselect, and low, from bottom to top, the spool valve moving upwardly with the downward movement of the gear shift lever.

The second shuttle valve, which controls the third transmission shaft clutches, controls a main fluid pressure line, leading directly from a pressure fluid supply pump, provided with a high pressure relief valve preferably rated at 125 p.s.i.g. A pair of secondary fluid pressure lines controlled by the second shuttle valve are supplied with pressure fluid by way of the rotary selector valve and valve sleeve and are provided with a low pressure relief valve preferably rated at 50 p.s.i.g. Both of the relief valves drain through the same line to a spray ring in the machine tool which serves to cool the hydraulic fluid before it is returned to the reservoir or sump, illustrated schematically in Fig. 4.

The chart in Fig. 24 shows which clutches are actuated to attain the various transmission speeds, or the brake or neutral conditions.

Referring to Fig. 1, a machine tool is shown for illustrative purposes and is indicated generally by reference numeral 30. A headstock 31 is located at one end of a bed 32. The bed 32 is provided with parallel front and rear ways 33 which extend from the headstock 31 to the other end of the bed 32. A turret slide 34 and a cross slide carriage 35 are supported on the ways 33 for movement toward and from a rotatable work spindle 36, rotatably supported in the headstock 31 on an axis substantially parallel to the ways 33, as is well understood in the art. Further description of the general features of the machine tool 30 need not be made in detail herein since the features are well understood in the art and the present invention is shown embodied therein solely for illustrative purposes since the present invention can be used in other types of apparatus.

Figure 2:
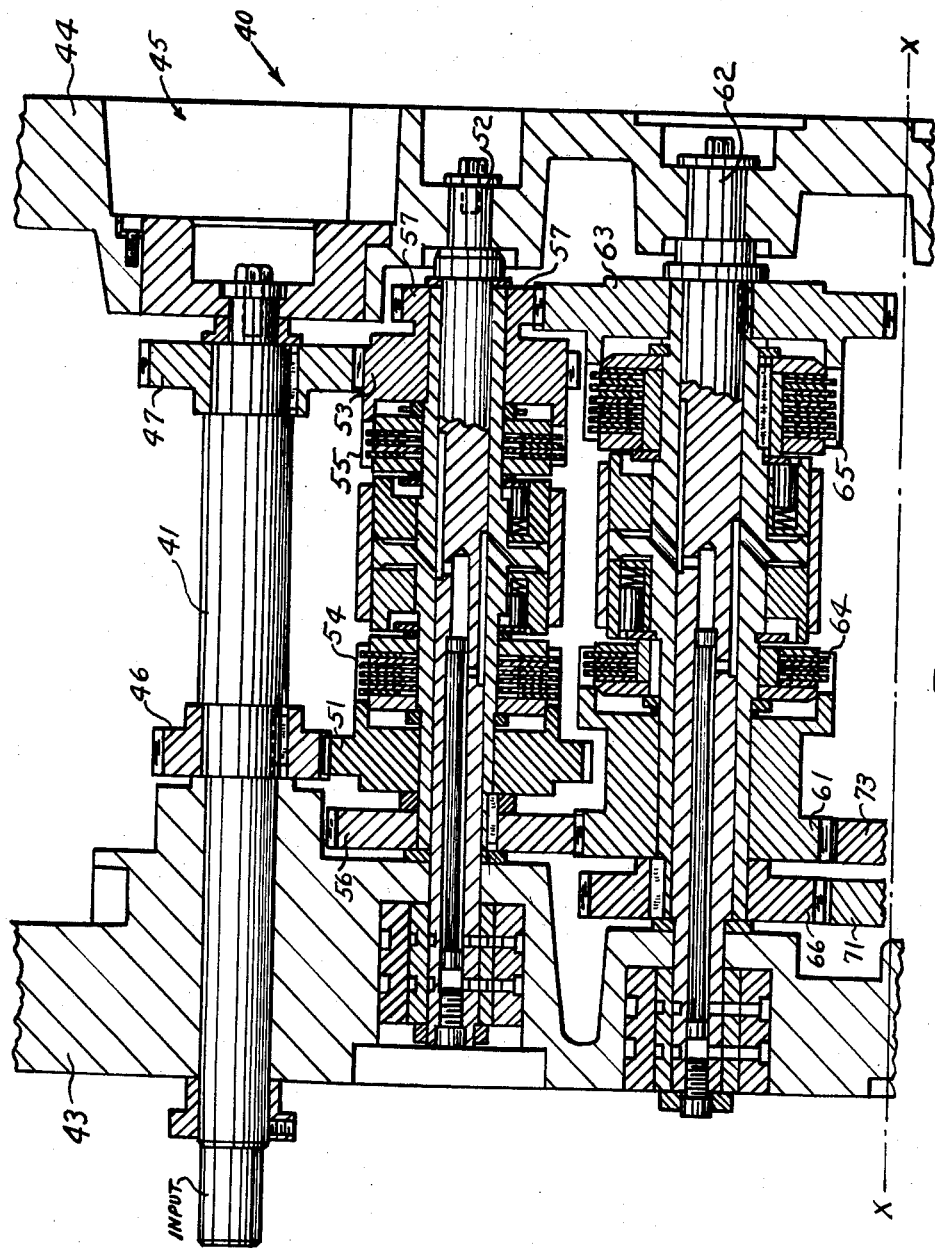
Figs. 2 and 3 are a developed view, with the parts thereof shown in section, of a change speed transmission embodying the present invention in the machine tool headstock.
Figure 3:
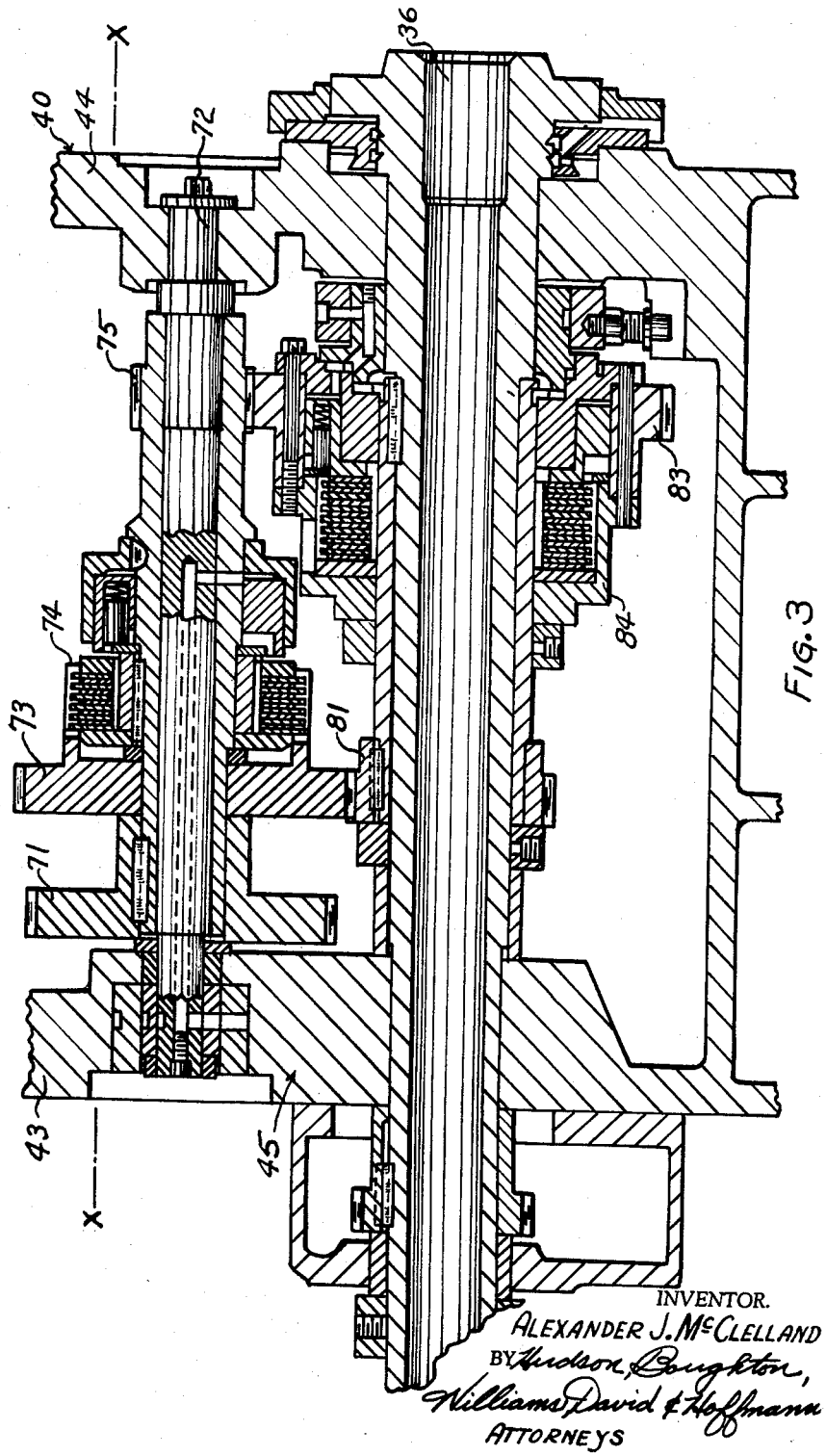

The source of power for a change speed transmission 40 situated in the headstock and which embodies the present invention may be any suitable source of power such as a reversible electric motor, not shown, that drives a pulley fixed to a power input shaft 41, Fig. 2, as will be well understood in the art. In the preferred embodiment of the present invention, the shaft 41 is driven by a reversible two-speed, forward and reverse, electric motor controlled by a high-low speed electric switch selector 42, Fig. 1. By providing two input speeds for the shaft 41 from the electric motor, the number of possible spindle speeds available from the change speed transmission 40 is doubled.

*Transmission*

The power input shaft 41 in Fig. 2 extends into and is rotatively supported in the headstock 31 by suitable journal bearings disposed in spaced apart vertical walls 43 and 44 integrally connected with and forming a part of a headstock housing or frame 45. A small drive gear 46 and a larger drive gear 47 are keyed to the input shaft 41 between the walls 43 and 44 in axially spaced relationship. The small drive gear 46 continuously meshes with a driven gear 51 freely rotatable on a first driven shaft 52 rotatably journaled in the spaced apart walls 43 and 44 of the headstock frame 45.

The larger forward drive gear 47 keyed to the input shaft 41 is constantly in mesh with a second gear 53 freely journaled on the first driven shaft 52.

It will be understood that the driven gears 51 and 53, freely rotatable on the first shaft 52, rotate in the same forward direction when driven by the gears 46, 47. The driven gears 51 and 53 are connected to drive the first shaft 52 upon energization or actuation of a forward fluid pressure actuated friction clutch 54 and a smaller forward fluid pressure actuated friction clutch 55, respectively. Any suitable form of clutch may be employed for the clutches 54 and 55. However, for purposes of illustrating the present invention, hydraulically actuated friction clutches described in Schoepe, et al. Patent No. 2,670,633, issued March 2, 1954, are shown and will be described herein only to the extent necessary for describing the operation of the present preferred embodiment of the invention. For a more complete and detailed description of the clutches 54 and 55 and of the clutches to be referred to hereinafter the Schoepe et al. Patent 2,670,633 can be referred to.

A large driven gear 56 and a smaller driven gear 57 are keyed to the first shaft 52 and are respectively disposed adjacent to gears 51 and 53 on the outer ends of shaft 52.

Gear 56 is continuously in mesh with a gear 61 freely journaled on a second driven shaft 62 journaled in the headstock frame and gear 57 drivingly engages a larger gear 63 rotatable on shaft 62. A pair of fluid pressure actuated clutches 64, 65, disposed coaxially about the shaft 62, are actuatable to selectively connect the gears 61, 63, respectively, to drive the shaft 62. The shaft 62 and the spindle 36 are braked when both clutches 64 and 65 are actuated as will be explained later. A small gear 66, keyed to shaft 62 and disposed on the outer end thereof adjacent gear 61, is in meshing engagement with a larger gear 71 keyed to a third driven shaft 72. In juxtaposition to the gear 71, a still larger gear 73 is freely journaled on shaft 72. A fluid pressure actuated clutch 74 has one clutch element thereof connected to the gear 73 and the other clutch element thereof is keyed to the shaft 72 for selectively connecting gear 73 so to be driven from the shaft 72 when the clutch is actuated. The third driven shaft 72 is journaled in the side walls 43 and 44 of the headstock frame 45.

A small gear 75, integrally connected with shaft 72, is spaced from but disposed closely adjacent to side wall 44 of headstock frame 45 for a purpose to be described. Upon actuating clutch 74, motion from shaft 72 will be transferred to gear 73, which is in meshing engagement with a small driven gear 81 keyed to the work spindle 36.

Work spindle 36 is rotatably journaled in a conventional manner in the spaced apart side walls 43 and 44 of headstock frame 45.

The gear 75, on the shaft 72, is in driving engagement with a larger gear 83, which is freely journaled on work spindle 36. A fluid pressure actuated clutch 84 has the input element thereon connected to the gear 83 and the output element connected to the spindle 36 and is actuatable to connect the gear 83 to drive the spindle 36.

The transmission described hereinabove is capable of transmitting movement to the work spindle 36 and driving the same at eight different speeds in either of two directions. For purposes of describing the present invention, a transmission has been provided which is capable of driving the work spindle 36 in a reverse direction by reversing the motor controlled by switch selector 42. Moreover, by virtue of the inclusion of the two speed electric motor operated by the high-low electric switch selector 42, as shown in Fig. 1, the capacity of the present transmission is doubled and the work spindle shaft 36 can be driven at sixteen speeds forward or in reverse.

Speed control device

Referring to Fig. 4, a motor driven pump 85 draws fluid from a sump 86 by means of an intake line 87 and pumps fluid through a pressure line 88 and a filter 89 into a line 90, having a pressure gauge 91 operatively secured thereto. Line 90 feeds to a speed control device and more particularly a speed control valve assembly indicated generally by the reference numeral 100 having a ball type control handle 101, best shown in Figs. 1, 5 and 6, and comprising a spool valve 102 and a rotary selector valve 103.

The spool valve 102, and rotary selector valve 103 are connected together, so that upon moving the ball handle 101 in a horizontal arc the spool valve 102 and rotary selector 103 are correspondingly rotated. The speed control valve is so constructed that upon moving the ball handle 101 upwardly from a central, horizontal preselected position to a high speed range position or rocking the ball handle 101 downwardly to a low speed position, the spool valve 102 is caused to move vertically downwardly or upwardly, respectively, within the rotary selector valve 103, the ball handle 101 being fulcrumed and pivotally connected to two parallel upstanding lugs 104.

Spool valve

The spool valve of the speed control valve assembly 100 is slidably disposed in a central bore 114 in the rotary valve 103 and has a pair of axially spaced apart lands 110 and 111 and a stem portion 112 of reduced diameter between the lands 110 and 111 for permitting fluid flow in an annular space 113 between the stem portion 112 and the wall of the bore 114. A third land 115 is axially spaced above land 110 and integrally connected thereto by means of a stem portion 116 of substantially the same diameter as stem portion 112. An annular space 117 is formed between stem portion 116 and the wall of the bore 114. As best seen in Fig. 9, the spool valve 102 has an axially upwardly extending conduit 118 therein terminating at its upper end in a transverse opening 119, opening 119 communicating with annular space 117. The lower end of conduit 118 communicates with bore 114.

Referring to Fig. 6, the spool valve 102 is shown provided with a vertically upwardly extending cylindrical portion 120 integrally connecting with the upper portion of land 115, and which portion 120 has a reduced end portion 121. A bushing 122 is slidably disposed over the reduced end portion 121 of spool valve member 102 and secured thereto by means of a roll pin 123 extending diametrically through the reduced end portion 121 and bushing 122. The bushing 122 is provided with a pair of oppositely facing flats 124.

The speed control handle 101 comprises a ball end 125 integrally formed with the outer end of a lever arm 126, which has its inner end threaded into a shell or turtleback 127 of substantially U-shaped cross-section formed by downwardly extending side members 128 and 129 connected together by a body portion 130. A pair of cylindrical embossments 133 and 134 are oppositely disposed and integrally connected with the downwardly extending side walls of flange members 128 and 129. A dowel pin 135 extends transversely through diametrically extending coaxial openings formed in embossments 133 and 134, which extend toward each other from the opposite inside walls of flange members 128 and 129, and diametrically through the bushing 122 for connecting the turtleback 127 to the spool valve 102. A pair of opposing faces 136 and 137 of embossments 133 and 134, respectively, are in juxtaposition with the flats 124 of the bushing 122, Figs. 5, 6.

A cover plate 140, provided with a central hub portion 141 and a peripheral upstanding flange 142, is coaxially disposed over the valve member 102. The undersurface 143 of cover plate 140 is substantially planar for resting upon an upper surface 144 of a concentrically disposed flat bearing ring 145 on the upper side of the head stock housing 45. Cover plate 140 is provided with the upstanding lugs 104 which have a circular hole 146 formed therein for receiving a dowel pin 147 therethrough. The outer ends of the dowel pin 147 are securely fitted in the flange members 128 and 129. Dowel pin 147 forms a fulcrum in conjunction with the upstanding lugs 104 so that the speed control handle 101 can be rocked up and down in a vertical direction for reciprocating or moving the spool valve 102 vertically in an opposite direction.

A radially extending, partially threaded hole 148 is formed in the hub portion 141 of cover plate 140 and corresponds with a radial bore hole 149 in a stepped bushing 151, the stepped bushing 151 having a central cylindrical opening 152 and a cylindrical outer surface 153 for being respectively slidably disposed over the spool valve portion 120 and into the opening formed in the hub portion 141 of the plate 140. The stepped bushing 151 is keyed to the plate 140 and to the rotary selector valve 103 by means of keys 154 and 155, respectively in a conventional manner so that upon rotating plate 140 the stepped bushing 151 and the rotary selector valve 103 are correspondingly rotated in unison therewith, Figs. 6 and 9.

In addition, in order to assure that the connection between the stepped bushing 151 and the cover plate 140 is secure, a hollow lockscrew 156 is threaded into the hole 148 in hub portion 141 of plate 140 and extends into the communicating radial bore hole 149 in the stepped bushing 151.

The central periphery of spool valve portion 120 is formed with three axially spaced apart, juxtaposed, V-shaped grooves 157 for seating a ball 158, a major portion of which is reposed in an adjacent bore hole 159. A partially internally threaded opening 160 essentially houses a helical spring 162 which has one end thereof biased against the exposed surface of the ball 158 and the other end bearing against an inner end of a screw 163 threaded into the threaded outer end portion of the opening 160.

The spring biased ball 158 serves the function of permitting the operator to sense or feel the location of the preselect position 165, the high speed range position 166 and the low speed range position 167 of the speed control handle 101 as shown in Fig. 6.

A sleeve 170, Figs. 6 and 9, is slidably disposed about the rotary selector valve 103 and retained in place by means of an internally stepped ring 171 seated over and secured to the upper end portion thereof by means of conventional means such as screws 172 and roll pins 173, Fig. 9. The ring 171 is prevented from moving upwardly and downwardly by means of a radially inwardly extending annular shoulder 174 concentrically disposed over stepped bushing 151 and sandwiched between the latter and the plate member 140. The sleeve 170, comprising a vertically upstanding flat wall 175 and a flange 176 disposed perpendicularly thereto, is secured by appropriate means such as stud bolts 177, to a substantially horizontal base plate 178 in the housing 45.

The speed control handle is adapted to be moved through a flat, horizontal arc to any one of the speed preselect positions 1—5, 2—6, 3—7, 4—8, and also to be positioned at B to brake the transmission and thereby stop the spindle, and also to place the speed control handle in a neutral position N so that the clutches 54, 55, 74 and 84 are disengaged and the spindle 36 is free to be turned manually, Figs. 4, 5 and 24.

In order for the operator of the machine tool to properly and positively locate each individual position of the speed control lever when moving the handle between the neutral position N, brake B and the four forward speed preselect positions 1—5, 2—6, 3—7, 4—8, a plurality of conically shaped depressions 180 are spaced apart in the upper surface of the ring 171 to define the foregoing positions. Each of the positions defined by the conical depressions 180 are equally spaced apart along an arc of a circle having the central vertical axis of the spool valve 102 as its center. A ball 181 is loosely disposed within a drilled hole 182 in plate 140, which drilled hole 182 has an axis parallel to the axis of the cover plate 140, Fig. 8. A helical spring 183 is disposed over a headed stem 184 and seated against a button head 185 integral with one end of the stem 184, which button head 185 bears against the adjacent periphery of the ball 181. A setscrew 186 is threaded into the outer end of the drill hole 182 and bears against the helical spring 183 for adjusting the tension of the latter against the ball 181. The foregoing arrangement functions somewhat similar to the spring-pressed ball 158, which cooperates with the V-shaped annular grooves 157 in the spool valve portion 118, so that the operator can accurately position the speed control handle in any one of the brake, neutral and forward speed preselect positions and accordingly align the ports in the rotary selector valve 103.

A guide ring 187 is loosely disposed over the ring 171 and concentrically secured to the bottom face of the cover plate 140. An outer periphery 188 of the guide ring 187 is slidably guided, when rotated, by the flat bearing ring 145.

Referring to Figs. 5 to 7 a safety arrangement is provided in the form of a stop pin 195 vertically disposed in an opening 196 in the plate 140. The stop pin 195 is resiliently biased vertically downwardly and is adapted to protrude below the bottom face of the circular cover plate 140, Fig. 6. A stop flange 197 is formed near the lower end of the stop pin 195 so as to provide an abutment shoulder for seating the lower end of a helical spring 198, the other end of the helical spring 198 being in abutment against a shoulder portion 199 formed in the opening 196. The over-all length of the pin 195 is slightly greater than the thickness or height of cover plate 140, so as to be capable of protruding below and above the hub portion 141 thereof and adapted to engage an inner end 200 of a hand operated lever 201, the lever 201 being pivotally secured by means of a pivot pin 202 to the turtleback 127, Fig. 6.

A torsion spring 203 has an axially extending tang 204 secured adjacent pin 202 in an adjacent portion of the turtleback 127, and a second tang 205 is secured in an adjacent portion of the hand operated lever 201 near the pin 202. The torsion spring 203 is operative to bias the lever normally in a counterclockwise direction, as viewed in Fig. 5, about the pivot pin 202. The outer hand-gripping end of lever 201 is formed with a handle 206 of angular cross-section.

The purpose of the lever 201 is to prevent the spindle from being accidentally rotated should someone inadvertently bump the lever 201 when the lever is in the braking or the neutral position without first pressing the lever 201 towards arm 126 of control handle 101 so as to permit the movement of the control handle 101 out of the braking and neutral positions.

The stop pin 195 is provided with a rounded lower end 208 extending below the shoulder portion 197 so as to be engageable within an arcuate groove segment 210 of substantially semi-circular cross-section in ring 171, disposed immediately below the cover plate 140. The arcuate groove segment 210 is in the vicinity of the braking and neutral positions, but not extending beyond the same, so that when the control handle 101 is in the braking or neutral positions the helical spring 198 urges the stop pin 195 into the arcuate groove segment 210 and locks the control lever 101 against horizontal movement from the neutral and brake positions by positioning inner end 200 of the hand operated lever 201 over the top of the pin 195 when the lower end 208 of the pin 195 is in the groove segment 210.

When the operator desires to select or preselect a spindle speed from a braking or neutral position, it is necessary that the hand gripping lever 201 be pressed against the action of the torsion spring 203 so as to free the stop pin 195 for movement upwardly out of the arcuate groove 210 against the action of the spring 198. The ends of the arcuate groove segment 210 are provided with inclinations or ramps, so that the pin 195 can be forced out of the groove.

Rotary selector valve

The pump feed line 90 conducts pressure fluid to the space 113 of the spool valve 102 by way of an inlet port 90a in the base plate 178, a vertical inlet passage 90b and a horizontal bore hole 90c in the sleeve 170 to a groove 90d in the body 249 of the valve 103 and a radially inwardly directed port 90e, Figs. 9, 10, 18 and 19.

The central cylindrical bore 114 in the rotary selector valve 103 communicates with a drain bore 250 formed in the base plate 178 and having a circular counterbore 251 in the upper surface thereof, which communicates directly with the bore 114. An axially extending, eccentrically disposed drain hole 252, which is parallel to bore 114, is formed in the annular body 249 of rotary selector valve 103. The upper end of the drain tributary hole 252 communicates with a radially outwardly extending drain opening 254 in the rotary selector valve body 249. A second radially extending drain tributary opening 255 communicates with the drill hole 252 at the medial portion thereof. An annular drain groove 256 of substantially rectangular cross-section is formed in the periphery of selector valve body 249 at the level of the port 254 and communicates with the drain port 250, through the port 254, Figs. 9, 14 and 23.

Figure 15:
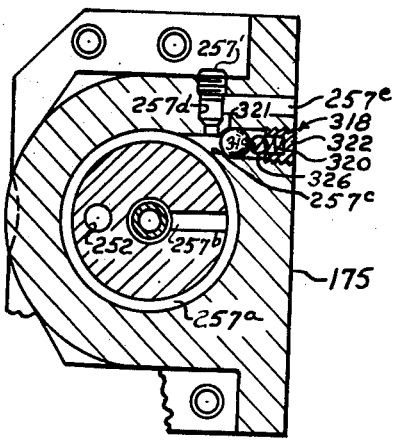

In Figs. 9, 15 and 23, a second peripheral groove 257a forms part of a pilot pressure line 257 and is disposed below groove 256 and is substantially parallel therewith. The groove 257a communicates with the central bore 114 of the rotary selector valve 103 by means of a radially inwardly extending bore hole 257b. The bore hole 257b forms a part of the pilot pressure line 257, shown schematically in Fig. 4, the line 257 being part of the fluid control circuit for the transmission clutches 74, 84.

A third peripheral pressure fluid distributing groove 259 disposed in parallel relationship with groove 257a is formed with axially downwardly extending groove segments 260, 261, 262, 263, 264, 265, 266 and 267, Fig. 23.

Figure 17:
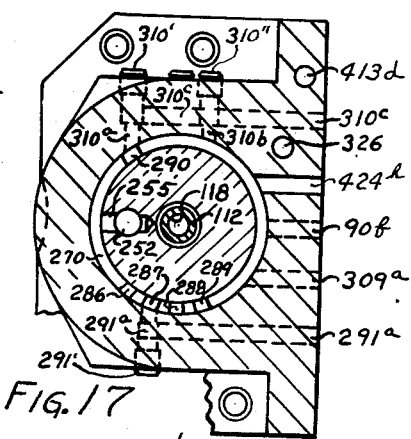

A fourth peripheral groove 270 communicates with the drain opening 255 and is formed with circumferentially spaced, upwardly extending apertures or bays 271, 272, 273, 274, 275, 276, 277, 278, 279, 280 and 281 as shown in Figs. 17 and 23. When the control handle is in brake position, the upper ends of the apertures 273, 276, 277 and 280 register with pick-off ports 282a, 283a, 284a, and 285a in valve sleeve 170 and form part of pilot pressure lines 282, 283, 284 and 285, respectively. Referring to Fig. 23, the drain groove 270 is also provided with downwardly extending apertures or bays 286, 287, 288, 289 and 290 with the aperture 287, when the handle is in brake position, communicating with a dog-leg passage 291a, forming a part of the clutch pressure line 291, in the valve sleeve 170 and draining the same to the drain port 250. One leg portion of the dog-leg passage 291 is closed with a closure member 291', Fig. 17, and the other leg portion opens to the planar face 175 of sleeve 170.

A fifth peripheral groove 90d, disposed below and parallel to the groove 270, is a pressure groove provided with a radially inwardly extending fluid pressure port 90e communicating with the interior of the axially extending bore 114. The groove 90d is also formed with upwardly extending groove segments 297, 298, 299, 300, 301, 302, 303, 304, 305, 306, 307, and 308 substantially the same depth as groove 259 for selectively conducting pressure fluid to the clutches. When valve 103 is in brake position, grooves 301 and 306 communicate at the upper ends thereof with the pickoff two ports 309a and 310a, Figs. 10, 17, forming clutch pressure lines in valve sleeve 170, which lines connect with the interior of bore 114 of the selector valve 103 through the ports 309a, 310a, groove 90d and the pressure port 90e. A bore hole 310b is located between the ports 309a and 310a in sleeve 170 which communicates with port 310a by way of a common passage 310c, Fig. 17. The outer ends of the passages 310a and 310b are closed by closure members 310' and 310", respectively.

A sixth peripheral groove 315a, forming part of the pilot pressure line 315, is located below the groove 90d and substantially parallel thereto and communicates with a radial port 315b, which terminates in the bore 114 of rotary selector valve 103.

Ports 254 and 255, groove segment 260 and groove 297 are substantially vertically aligned. Groove 298 and aperture 271 are vertically aligned. Groove 299 and groove segment 261 are vertically aligned. Apertures 272 and 286 are vertically aligned. Ports 282a and 291a, as well as apertures 273 and 287 are vertically aligned. Apertures 274, 288 are vertically aligned. Groove segment 262 and aperture 289 are vertically aligned. Groove segment 263 and groove 300 are vertically aligned. Aperture 275, port 309a and groove 301 are vertically aligned. Port 283a, aperture 276 and groove 302 are vertically aligned. Port 257b, groove segment 264, groove 303, port 90e and port 315b are vertically aligned. Port 284a, aperture 277, and groove 304 are vertically aligned. Groove segment 265 and groove 305 are vertically aligned. Groove segment 266 and aperture 290 are vertically aligned. Groove segment 267, port 310a and groove 306 are vertically aligned. Aperture 281 and groove 308 are vertically aligned. Each of the foregoing vertical alignments is successively spaced 18° from the preceding alignment about the periphery of the selector valve 103 and the alignments of the ports referred to in the valve sleeve 170 with the valve 103, Fig. 23.

*Selector valve sleeve*

Figure 14:
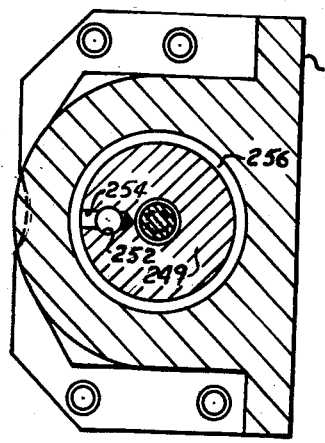

Rotary selector valve sleeve 170, as shown in Figs. 9, 14 and 15 has a substantially horizontal, partially threaded opening 257c communicating with the rotary selector valve groove 257a and is provided with a one-way check valve 318 comprised of a ball 319 resiliently urged by a spring 320 against a seat 321 and a counterbored closure member 322 threaded into the opening 257c. A passage 257d is formed in the wall of sleeve 170 normal to the opening 257c from the outside thereof and closed with a closure member 257'. An opening 257e connects with the passage 257d and opens to the sleeve face 175.

Figure 18:
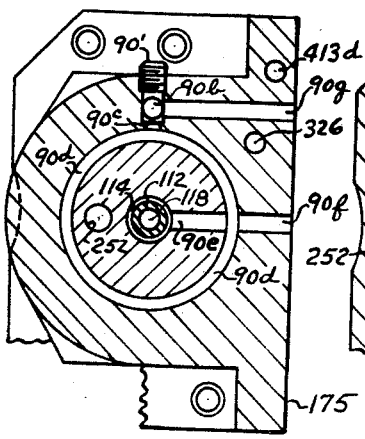
Figure 19:
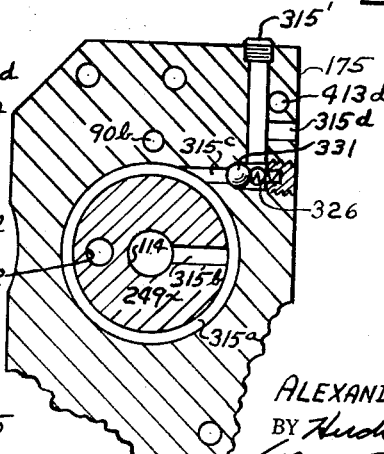

A substantially vertical passage 326 communicates with the opening 257c, on the side of the check valve 318 remote from the rotary valve. As best seen in Figs. 10, 18 and 19, drill passage 326 extends axially and parallel with bore 114 of rotary selector valve 103 and is closed at its lower end by a closure member 326', Fig. 10.

Figure 16:
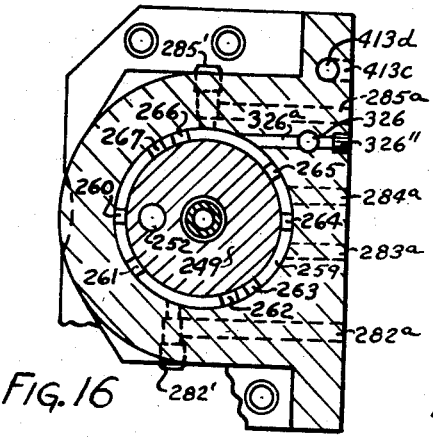

A horizontal opening 326a communicates with the groove 259, Fig. 16, and has its outer end closed by a closure member 326". The lower end of vertical hole 326 communicates with a transverse opening 315c which has one end opening to the groove 315a of the rotary selector valve 103, Fig. 19. The communication of vertical opening 326 is controlled by a ball check valve assembly 331 similar to assembly 318. The check valve 331 normally permits fluid flow under pressure from the peripheral groove 315a and transverse opening 315c into the vertical opening 326, but prevents fluid flow in a reverse direction. Horizontal opening 315c communicates with a dog-leg passage 315d, one leg portion of passage 315d being closed with a closure member 315', Fig. 19.

Again referring to Fig. 16, the horizontal, coplanar and substantially parallel pickoff ports 282a, 283a, 284a and 285a, which form a part of the pilot pressure lines 282, 283, 284, and 285, respectively, are each adapted to be placed in communication with the groove 259 of valve 103 by the registration of one of the groove segments 260–267 therewith. The pickoff ports 282a and 285a are formed by dog-leg passages closed with conventional closure members 282' and 285', respectively.

Referring to Fig. 18, an opening 90f in the valve sleeve continuously communicates with the groove 90d of the rotary selector valve 103. A second opening 90g parallel to and coplanar with opening 90f communicates with the vertical opening 90b, which, in turn, communicates with the annular groove 90d in the rotary selector valve 103 through the opening 90c. The outer end of the opening 90c is closed with a closure member 90'. Openings 90f and 90g are continuously supplied with pressure fluid from the pump 85 by way of the duct 90a in the base plate 178.

Forming a part of the control valve assembly are a juxtaposed manifold 370 and a control member housing 371, both of which are secured together and against the face 175 of the sleeve 170 by four stud bolts 372.

Control members

Referring to Figs. 9, 13 and 20 to 22, the second, third and first clutch control members or shuttle valves, 373, 374, 375, respectively, are disposed in the control housing 371, Figs. 9, 13, 20 and 22, with a low pressure relief valve 376 and a high pressure relief valve 377, Figs. 9, 20, 21 and 22. Each of the control members 373, 374 and 375 are substantially identical and each consists of a spool valve having four main lands defining three annular grooves. More particularly, control member 373 has clutch pressure line grooves 378, 379 and 380. Control member 374 has clutch pressure line grooves 381, 382 and 383. Control member 375 has clutch pressure line grooves 384, 385 and 386. A pair of V-shaped grooves 387 and 388 are formed in control member 373 for selectively receiving a spring pressed ball 389 housed within a cylindrical, transverse bore and retained therein by a suitable closure member, Figs. 4, 13 and 20. Similarly, control member 374 has two V-shaped grooves 390 and 391 with a spring-pressed ball 392, and control member 375 has two V-shaped grooves 393 and 394 with a spring pressed ball 395. The control members 373, 374 and 375 are respectively provided with axially extending end stop members 396 and 397, 398 and 399, and 400 and 401.

Control members 373, 374 and 375 are reciprocably disposed in three vertically spaced, horizontal and substantially parallel bores 402, 403 and 404, respectively. The outer ends of each of the control member bores 402, 403 and 404 are internally threaded for receiving plug-like closure member 405. Accordingly, six closure members 405 are required. The distance between corresponding plug members 405 from either end of each of the bore holes 402, 403 and 404 is greater than the total length of each control member, so that each control member is free to move within its respective bore hole a predetermined rectilinear distance. However, each of the control members are adapted to have only two discrete positions as defined by its V-shaped grooves relative to the juxtaposed spring pressed ball.

Referring again to Fig. 4, the pump 85 discharges fluid to a pressure line 88 through a filter 89 into a pressure line 90, which branches off in several directions with one clutch pressure line 90 feeding directly to the annular chamber 113 in the rotary selective valve 103 via passages 90a, b, c, groove 90d and passage 90e. The pressure line 90 branches off in the sleeve 170 and feeds directly to the control member 373, and more particularly feeds through passages 90f in valve sleeve 170, 90h in the manifold 370 and 90i in the control housing 371 to the annular chamber 379 in the control member 373. Control member 373 selectively controls the supply of fluid to clutches 64 and 65 by way of supply lines 410 and 411, respectively.

Referring to Fig. 4, when the clutches are to be actuated to provide high speed corresponding to a certain setting of the control valve, the spool valve 102 is shifted downwardly to place a pickoff port 315b of the rotary valve into communication with the chamber 113 to effect the supply of pressure fluid to port 315g which opens into the space occupied by the end stop 399 at the right hand of control member 374 as the latter is viewed in Fig. 13. As also illustrated schematically in Fig. 4, the pressure to port 315g is supplied through a pilot line 315, of which the ports 315b and 315g are a part. The pilot line 315 is also comprised of the peripheral groove 315a, passages 315c and 315d in the valve sleeve 170, and passages 315e, 315f in the manifold 370, the latter passage registering with passage or port 315g opening adjacent the right end of the control member as viewed in Fig. 13. When pressure fluid is supplied through the port 315g, the third shuttle valve, and more particularly, the control member 374 shifts to the left, as viewed in Fig. 13, since the movement of the spool valve to supply pressure to the port 315g also causes the chamber occupied by the end stop 398, at the left hand end of the control member 374, as viewed in Fig. 13, to be drained through the pilot pressure line 257. More particularly, the chamber is drained through the passage 257b in the rotary valve which is placed in communication with the axial bore 118 in spool valve 102 when the valve moves downwardly to position its land 110 below the passage 257b, Fig. 9, the axial bore 118 always being connected to drain as described hereinbefore. In the illustrated structure, the port 257h in the housing 371, Fig. 13, is connected to the passage 257b, Fig. 15, which communicates with the groove 257a, through passages 257g and 257f in the manifold body, and passage 257e, Fig. 15, in the valve sleeve 170, the latter passage communicating with the groove 257a through the passages 257d, 257c, respectively.

When the spool valve is moved from its high speed, lowermost position to its low speed, uppermost position, its lands 110, 111 are positioned above the passages 257b, 315b so that the connection thereof to fluid pressure and drain are reversed with the passage 257b and, in turn, the port 257h communicating with the chamber, adjacent the right hand end of control member 374 as viewed in Fig. 4, being in communication with the pressure chamber 113, and the passage 315b being in communication with the drain port 250. It should be noted that whenever the valve spool 102 is moved from its neutral position to uncover the passages 257b, 315b, to supply pressure to one of them, the vertical passage 326 in the rotary valve is supplied with fluid pressure through either the check valve 331 or the check valve 318 in the passages 315c, 257c, respectively, see Figs. 10, 15 and 19.

In certain positions, this valve assembly effects the shifting of the second shuttle valve, and more particularly, the control member 373, by applying fluid pressure to one of the pilot lines 283, 284 shown schematically in Fig. 4 and by connecting the other line to drain. In the illustrated embodiment, the pilot lines 283, 284, connectable to drain and pressure, are controlled by peripheral grooves 259, 270, the groove 259 being a pressure groove and the groove 270 being a drain groove. The pressure groove 259 is connected to the pressure chamber 113 by way of the vertical pressure passage 326 and the horizontal passage 326a. The drain groove 270 is connected to the vertical drain passage 252 of the rotary valve through the port 255 in the rotary valve. In the illustrated valve assembly the grooves 259, 270 have, as described hereinbefore, radially spaced, axially extending, parallel groove segments 260–267 in the case of groove 259, and 271–281 in the case of groove 270, which are adapted to successively register with the pickup ports 283a, 284a in the valve sleeve 170 as the rotary valve 103 is rotated. When a groove segment of groove 259 registers with one of the pickoff ports 283a, 284a, a groove segment of groove 270 registers with the other pickoff port to effect a shifting of the control member 373.

In the illustrated structure, the pilot line 283 is comprised of the pickoff port 283a in the valve sleeve 170, passages 283b, 283c on the manifold and a passage 283d in the housing 371 which opens into the chamber occupied by the end stop 396 adjacent the left hand end of the control member 373 as the latter is viewed in Fig. 13. The pilot line 284, in the illustrated structure, is comprised of the valve sleeve pickoff port 284a, Figs. 10 and 16, the manifold passages 284b, 284c, and the passage 284d in housing 371, which opens in the chamber occupied by the end stop 397 on the right hand end of control member 373, Fig. 13.

The groove segments 260–267 of the groove 259 are positioned so that one segment thereof registers with the pickoff port 283a when the rotary valve 103 is in the first and second speed positions, respectively, and so that the pickoff port 284a communicates with the grooves 264, 263, 262, when the rotary valve is in neutral, third and fourth speed positions, respectively.

Similarly, the first shuttle valve, and more specifically, the control member 375 is operated for controlling the clutches 54, 55 on the second shaft 52, by applying fluid pressure to either of its ends by way of pilot pressure lines 282 and 285, respectively, Fig. 4. The pilot pressure lines 282 and 285 are connected to drain when one of the groove segments of groove 270 registers with the pickoff ports 282a, 285a, respectively, through the drain groove 270, port 254, vertical drain passage 252 in the rotary valve, and out through port 250 in the base plate 178. The lines 282 and 285, like lines 283 and 284, are respectively connected to the pressure supply groove 259 in the valve sleeve 170 when segments of groove 259 register with pickoff ports 283a, 284a.

When the pilot pressure line 282 is connected to the pressure groove 259, its pickoff port 282a is connected with one of the groove segments 261 and 260 of groove 259, and this only occurs when the gear shift lever 101 is in the first and third speed positions, respectively, the pickoff port 282a being connected to the drain groove 270 by way of its groove segments 273, 272, 271 and 281 when the gear shift lever 101 is in the brake, neutral, second and fourth speed positions, respectively.

The pilot pressure line 282 is comprised of the pickoff port 282a in the sleeve 170, the pasages 282b, 282c in the manifold 370 and the port 282d in the housing 371, the port 282d communicating with the chamber occupied by the end stop 400 on the left end of the control member 375, Figs. 10–13.

The pickoff port 285a of the pilot pressure line 285 is connected with the groove segments 265, 264 of groove 259 in the second and fourth speed positions of the gear shift lever, respectively. However, when the gear shift lever is in the brake, neutral, first and third speed positions, the pickoff port 285a is respectively connected to the groove segments 280, 279, 278, 277 of the drain groove 270, Fig. 23.

The pilot pressure line 285 is comprised of the pickoff port 285a in the sleeve 170, the passages 285b, 285c in the manifold 370, and the port 285d in the control housing 371 which communicates with the chamber at the right hand end of the control member 375 as viewed in the drawings and occupied by the end stop 401 of the control member 375, Figs. 10–13.

The clutches 54, 55 on the second shaft 52 are respectively operated by the shifting of the first shuttle valve or control member 375 to its left or right positions by supplying fluid to the chamber at the proper end thereof by way of one of the pilot pressure lines 282 or 285 as described above and connecting the other chamber at the other end of the control member 375 to drain. This causes the shuttle valve 375 to shift and supply pressure fluid from a clutch pressure line 291 into one of the clutch lead lines 420 and 421, the line 420 leading to the clutch 54 and the line 421 leading to the clutch 55, Fig. 4. When the shuttle valve shifts to supply pressure to one of the lines 420, 421, it connects the other to drain.

Fluid is supplied to the clutch pressure line 291 when its pickoff port 291a in the sleeve 170 is connected with any one of the groove segments 299, 298, 297, 308 of the pressure groove 90d when the gear shift lever is in speeds 1—4, respectively. The clutch pressure line is comprised of the pickoff port 291a in the sleeve 170, the passages 291b, c, d, in the manifold 370, and a port 201e in the control housing 371 communicating with the groove 385 of the control member 375.

The grooves 384 and 386 of the control member 375 on either side of the groove 385 are always connected to a drain line 424 and feeds to the sump 86, Fig. 4. However, first the drained fluid is cooled by being forced through a spray ring 412. More particularly, the drain groove 384 communicates with a similar drain groove 381 of the control member 374 by way of interconnecting passages 424a, b, c in the control housing. The passage 424c is connected to drain through passages 424d, e, f, g in the manifold 370, and a port 424h in sleeve 170, to the drain groove 270, the port 424h always connecting with the drain groove 270.

The clutches 64, 65 on the third shaft 62 are controlled by the second shuttle valve or control member 373, the pilot pressure lines 283, 284, Fig. 4, operating to shift the control member 373 as described.

Upon shifting the control member 373 to the right, pressure fluid is supplied to the clutch 64 through a lead line 410 from a clutch pressure line 90 and the pressure groove 379 of the control member 373, Fig. 13. The line 90 is comprised of a pickoff port 90f in the sleeve 170 which always communicates with the pressure groove 90d, passage means 90h in the manifold, and a port 90i in the housing 371, the latter communicating with the groove 379 of the control member 373, Figs. 10–13.

Similarly, upon shifting the control member 373 to the left, pressure fluid is supplied to the clutch 65 through a lead line 411 from the clutch pressure line 90, Fig. 4, and the pressure groove 379.

When only one of the two clutches 64 and 65 is to be engaged, the grooves 378 and 380 form a buffer zone on either side of the groove 379 and are connected to drain through a line 309 to the drain groove 270 to disengage the other clutch. The line 309 is comprised of a pair of horizontally spaced apart ports 309d and 309e respectively communicating with the grooves 378, 380 in the housing 371, the passages 309c, 309b in the manifold, and the pickoff port 309a in the sleeve 170. The pickoff port 309a, Figs. 10, 17, is adapted to be connected to the drain groove 270 by way of its groove segments 289, 288, 287, 286 when the gear shift lever is in any one of the four preselect speed positions 1—5, 2—6, 3—7, 4—8, respectively.

However, when the gear shift lever 101 is in its brake or neutral positions, the pickoff port 309a is respectively registered with the groove segments 301 or 300 of fluid pressure groove 90d and pressure fluid is supplied to the grooves 378, 380 by way of the line 309, Figs. 4 and 13. In which instance both of the clutches 64, 65 on the third shaft 62 are engaged regardless of the position the control member 373, since the pressure groove 379 is always connected to a constant source of pressure fluid in line 90 and the grooves 378 and 380 on either side of the groove 379 are connected to the line 309.

The clutches 74, 84 on the fourth shaft 72 and the spindle 36 are controlled by the third shuttle valve or control member 374. When the control member 374 is shifted to the right as viewed in Fig. 4 by supplying pressure fluid through the pilot pressure line 315 and connecting pilot pressure line 257 to drain, as described, the clutch 74 is actuated by pressure fluid flowing through a lead line 418 from a clutch pressure line 310 connecting with the groove 382 of the control member 374. The feed lines 418 and 419 are connected to the line 310 by way of the pressure groove 382 of the control member 374 when it is shifted to the right hand and left hand positions, respectively, as viewed in Fig. 4. When the feed line 418 is connected to the clutch control line 310, the line 419 is connected to drain groove 383. When the feed line 419 is connected to the pressure line 310, the line 418 is connected to the drain groove 381 of the control member 374.

Alternatively, the clutch 84 can be engaged by shifting the control member 374 to the left, as viewed in Fig. 4, by supplying pressure fluid to the pilot pressure line 257 and connecting the pilot pressure line 315 to drain, Fig. 4, as described. The clutch 84 is engaged by pressure fluid flowing through the lead line 419 from the clutch pressure line 310 via the pressure groove 382.

The drain grooves 381, 383 on either side of the pressure groove 382 of the control member 374, Fig. 13, are constantly connected to drain line 424 back to the spray ring 412 and the sump 86. More particularly, the drain groove 381 drains through the passage 424a which connects with the passage 424c and drain groove 270 as pointed out. The other drain groove 383 connects with a drain port 424i in the housing 371 and also communicates with the passage 424e, f, g, in the manifold and the drain groove 270 previously described.

More specifically, the clutch pressure line 310 is comprised of the arcuately spaced pickoff ports 310a, b, and interconnected by the passageway 310c in the sleeve 170, the pickoff ports 310a, b, connecting with the pressure groove 90d via certain ones of the groove segments 302—306, Fig. 23, when the gear shift lever is in brake and the different speed positions.

The pickoff port 310a connects with the drain groove 270 via its groove 290 only when the gear shift lever is in its neutral position so that neither of the clutches 74, 84 can be engaged at that time.

A pair of pressure relief valves 376, 377 are provided in order to control the pressure in the low pressure line 309 and the high pressure line 90, respectively, Figs. 4, 9, 21, 22.

More particularly, the low pressure relief valve 376 is, of course, only effective when the line 309 is supplied with pressure fluid. The relief valve 376 is comprised of a spring pressed plunger 376a, Fig. 21, biased into a drill hole. The fluid is bled off of line 309 at the passage 309c in the manifold 370 and conducted through a passage 309f in the housing 371 to a chamber 309g in the inner end of the drill hole occupied by the plunger 376a. From this point, the pressure is relieved when valve 376 opens through a drain line 413 shown schematically in Fig. 4 and also communicating with the drain side of relief valve 377.

The drain line 413 includes a drain passage 413a communicating with the drain side of relief valves 376, 377 and drain passages 413b, 413c, 413d and 413e formed in the housing 371, manifold 370 and valve sleeve 170 and leading to the spray ring 412, Figs. 10–13, 21, 22.

The high pressure relief valve 377 is comprised of a plunger 377a disposed in a drill hole parallel to the drill hole occupied by the plunger 376a, Figs. 21, 22. Fluid is bled off from the intake port 90b in the sleeve 170 through a passage 90g also in sleeve 170, passages 90j in the manifold 370, passages 90k, 90m, 90n in the housing 371 to a chamber 90p in the bottom of the drill hole occupied by the relief valve 377, Figs. 21, 22.

As described above, the valve 377 drains to the spray ring 412 and the sump 86 by way of the drain line 413.

Brake

As hereinbefore pointed out, the drawing illustrates the control handle 101 of the speed control mechanism 100 in a brake position, in which instance, as shown in Fig. 24, the clutches 64 and 65 and one of the clutches 74 and 84 are energized. Whether or not the clutch 74 or clutch 84 is energized depends upon whether the control handle 101 is placed in high or low position respectively.

More particularly, referring to the chart outlined hereinbelow and designated as chart A, when the control handle is in brake position the pilot lines 282 to 285 and clutch pressure line 291 are connected to the drain and the clutch pressure lines 309 and 310 are supplied with pressure fluid from pressure groove 90d in the selector valve 103. Referring to Fig. 4, the clutch pressure line 90 leads directly to control groove 379 and the clutch pressure line 309 branches off and feeds directly to control chambers 378 and 380. As a result, no matter what position the control member 373 is in, both the clutches 64 and 65 will be energized. However, only one of the clutches 74 and 84 will be energized by the supply of pressure fluid through line 310 to the control groove 382, depending upon whether the control handle 101 is in low position or high position, respectively, as hereinabove pointed out.

Neutral

When the control handle is placed in neutral position pilot lines 282, 283, 285 and clutch pressure lines 291 and 310 are drained. However, pilot line 284 and clutch pressure line 309 are supplied with pressure fluid so that the control member 373 is shifted to the left and the clutch 64 is energized, respectively. In addition, since the pressure line 90 continuously supplies pressure fluid to the control member 373, pressure fluid is supplied to the lead line 411 and the clutch 65 is engaged. But, due to the fact that the clutches 54, 55, 74 and 84 are not engaged, the spindle 36 is free to be turned manually although the clutches 64 and 65 are engaged, as seen in Fig. 24.

It will also be noted that only the clutches 64 and 65 are engaged when the control handle is placed in the brake preselect position which results in the spindle being in neutral. However, once the handle is placed in high or low brake position one of the clutches 74 or 84 will be engaged and the spindle will be braked or locked. One of the advantages of locking the shaft 62 when placing the control handle in neutral is that no power will be transmitted through the shaft 62 should any one of the clutches 54 and 55 on shaft 52 fail to be completely disengaged.

Speed 1—5

When the control handle 101 is placed in the 1—5 preselect position, the pilot lines 284, 285, and the clutch pressure line 309 are drained. The pilot lines 282 and 283 are supplied with pressure fluid from pressure groove 259 of the valve 103. Clutch pressure lines 291 and 310 are supplied with pressure fluid from control groove 90d of valve 103. Fluid in pilot line 282 serves to actuate the control member 375 to the right and fluid supplied to the clutch pressure line 291 serves to actuate the clutch 55. The pilot line 283 shifts the control member 373 to the right and pressure fluid energizes the clutch 64, clutch pressure line 90 always being supplied with pressure fluid from the pump. In addition, when selecting the first speed position, the control handle is in the 1—5 speed range and in a low position, and fluid is supplied through line 257 to shift the control member 374 to the left as viewed in Fig. 4, so that fluid in line 310 energizes clutch 84.

When the control handle 101 is placed in the high position the control member 374 is shifted to the right so that clutch 74 is energized.

Speed 2—6

When the speed control handle 101 is placed in preselect position designated 2—6, the pilot lines 282, 284, and clutch pressure line 309 are drained. Pilot lines 283 and 285 are supplied with pressure fluid from pressure groove 259 in control valve 103 and respectively shift the control member 373 to the right and the control member 375 to the left. Accordingly, clutch 64 is energized by pressure fluid in the clutch pressure line 90 and the clutch 54 is energized by pressure fluid supplied through the clutch pressure line 291 from control groove 90d of valve 103.

When the control handle 101 is placed in the low speed position, control member 374 is shifted to the left as viewed in Fig. 4, if it is not already so situated, and clutch 84 is energized to select the second speed.

When the control handle 101 is placed in the high speed position, control member 374 is shifted to the right and clutch 74 is energized to select the sixth speed.

Speed 3—7

By moving the control handle 101 to speed 3—7 preselect position, pilot lines 283, 285, and clutch pressure line 309 are drained, and pilot lines 282 and 284 are supplied with pressure fluid from pressure groove 259 of valve 103. This results in control member 375 being shifted to the right and pressure fluid, through clutch pressure line 291, energizing clutch 55, and control member 373 being shifted to the left, and clutch 65 being energized by way of fluid pressure in the line 90, respectively.

As pointed out hereinabove, by shifting the control handle 101 to the low position, the clutch 84 is energized so that the third speed is selected. Upon shifting the control member 101 to the high position, clutch 74 is energized and the seventh speed is selected.

*Speed 4—8*

Pilot lines 282, 283 and clutch pressure line 309 are drained and pilot lines 284, 285 and clutch pressure lines 291, 310 are supplied with pressure fluid when the control handle 101 is placed in the speed 4—8 in preselect position. Fluid pressure in the pilot lines 284 and 285 shift the control members 373 and 375 to the left for energizing clutches 65 and 54, respectively.

In the manner pointed out hereinabove, upon placing the control handle 101 in low position, clutch 84 is energized for obtaining the fourth speed, and upon placing the control handle 101 in the high position, clutch 74 is energized and the eighth speed is obtained.

It is apparent from the preceding that the spindle 36 cannot be driven until clutch 74 or clutch 84 is energized. This accounts for the preselection feature of the invention, which prevents the spindle 36 from being driven until the handle 101 is placed in a low or high position. However, this is not true in a case of the brake position, in which the brake is effective only upon the energization of either the low speed clutch 84, or high speed clutch 74. However, in order to obtain the neutral position, both of the high and low speed clutches 74, 84 must be de-energized. As a result, it makes no difference whether the control handle 101 is pressed out of the preselect position when neutral is desired.

Furthermore, if the control handle 101 is placed in a brake select position, the spindle 36 is essentially in neutral and not positively braked until the control handle is placed in a high or low position.

CHART A

| Control | 282 | 283 | 284 | 285 | 291 | 309 | 310 | |
|---|---|---|---|---|---|---|---|---|
| | | | | | | | a | b |
| B | D | D | D | D | D | 90d | 90d | ---- |
| N | D | D | 259 | D | D | 90d | D | ---- |
| 1-5 | 259 | 259 | D | D | 90d | D | ----- | 90d |
| 2-6 | D | 259 | D | 259 | 90d | D | ----- | 90d |
| 3-7 | 259 | D | 259 | D | 90d | D | ----- | 90d |
| 4-8 | D | D | 259 | 259 | 90d | D | 90d | 90d |

Note.—259 and 90d denote pressure grooves.

While I have shown and described a specific embodiment in accordance with my invention, it is understood that the same is susceptible of many changes and modifications, as known to a person skilled in the art, and I intend to cover all such changes and modifications as defined in the appended claims.

Having thus described my invention, I claim:

1. In a change speed transmission adapted to be used in a machine tool headstock having a power input shaft and a rotatable driven member such as a work spindle, a plurality of rotatable shafts intermediate said input shaft and said driven member, a gear train carried by said input shaft, said intermediate shafts and said driven member and including freely rotatable gears on said intermediate shafts and said driven member, and power actuated clutches on said intermediate shafts and said driven member for connecting said freely rotatable gears thereto, a control device for said clutches comprising reciprocable spool valve means and rotary selector valve means indexible about an axis for selectively energizing at least one of said clutches at each index position for obtaining a predetermined spindle speed, and said spool valve means being reciprocable along an axis for providing each index speed position of said rotary selector valve means with two different spindle speeds depending upon the relative axial position of said spool valve means.

2. In a change speed transmission as set forth in claim 1, wherein said clutches are pressure fluid actuated.

3. A control device for a plurality of power actuated clutches in a change speed transmission and comprising a source of pressure fluid, a plurality of movable control members each having two operative positions, each of said control members controlling the flow of fluid from said source to two of said clutches, and control valve means comprising spool valve means and rotary selector valve means for controlling the flow of fluid from said source to said control members for selectively controlling movement of said control members to effect engagement of certain of said clutches.

4. A control device as set forth in claim 3, wherein said spool valve means and said rotary selector valve means are connected together so that turning movement of one is transferred to the other, and said spool valve means are movable endwise in one direction to a high output speed position from an output speed preselect position and in an opposite direction to a low output speed position.

5. In a change speed transmission adapted to be used in a machine tool headstock having a power input shaft and a rotatable driven member such as a work spindle, a plurality of rotatable shafts intermediate said input shaft and said driven member, a gear train carried by said input shaft, said intermediate shafts and said driven member and including freely rotatable gears on said intermediate shafts and said driven member, power actuated clutches on said intermediate shafts and said driven member for connecting said freely rotatable gears thereto, a control device for said clutches comprising a plurality of movable control members each having two operative positions and each controlling two of said clutches, reciprocable spool valve means, and rotary selector valve means, said rotary selector valve being indexible about an axis for selectively controlling movement of said control members and effecting engagement of at least one of said clutches at each index position for obtaining a predetermined spindle speed, and said spool valve means being reciprocable along an axis for providing each index speed position of said rotary selector valve with two different spindle speeds depending upon the relative axial position of said spool valve means.

6. In a change speed transmission adapted to be used in a machine tool headstock having a power input shaft and a rotatable driven member such as a work spindle, a plurality of rotatable shafts intermediate said input shaft and said driven member, a gear train carried by said input shaft, said intermediate shafts and said driven member and including freely rotatable gears on said intermediate shafts and said driven member, power actuated clutches on said intermediate shafts and said driven member for connecting said freely rotatable gears thereto, a control device for said clutches comprising a coaxial reciprocable spool valve means and rotary selector valve means, said rotary selector valve being indexible about a central axis for selectively energizing at least one of said clutches at each index position for obtaining a predetermined spindle speed, and said spool valve means being reciprocable for providing each index position of said rotary selector valve with two different spindle speeds depending upon the position of said spool valve means along said central axis.

7. In a change speed transmission adapted to be used in a machine tool headstock having a power input shaft and a rotatable driven member such as a work spindle, a plurality of rotatable shafts intermediate said input shaft and said driven member, a gear train carried by said input shaft, said intermediate shafts and said driven member and including freely rotatable gears on said intermediate shafts and said driven member, and power actuated clutches on said intermediate shafts and said driven member for connecting said freely rotatable gears thereto, a control device for said clutches comprising control member means for controlling at least one of said clutches, and coaxial reciprocable spool valve means and rotary selector valve means, said rotary selector valve being indexible about a central axis for selectively controlling actuation of said control member means and effecting engagement of at least one of said clutches for obtaining a predetermined spindle speed, and said spool valve means being reciprocable along an axis for providing each index position of said rotary selector valve with two different spindle speeds depending upon the relative axial position of said spool valve means.

8. In a control system for a high speed clutch and a low speed clutch respectively actuatable for driving an output member of a change speed transmission at a high speed and at a low speed, a control member shiftable between first and second positions for respectively obtaining said high speed and said low speed by respectively causing said high speed clutch and said low speed clutch to be energized, first and second fluid pressure actuator means operable to shift said control member to said first position and to said second position, each of said first and second fluid pressure actuator means including a fluid pressure chamber at different ends of said control member, a source of pressure fluid, a drain for said pressure fluid, rotary valve means adapted to connect one of said first and second fluid pressure actuator means to said source of pressure fluid and to connect the other of said first and second fluid pressure actuator means to said drain, and reciprocable valve means in said rotary valve means for controlling the connection of said first and second fluid pressure actuator means to said source of pressure fluid and to said drain.

9. In a change speed transmission adapted to be used in a machine tool headstock having a power input shaft and a rotatable driven member such as a work spindle, a plurality of rotatable shafts intermediate said input shaft and said driven member, a gear train carried by said input shaft, said intermediate shafts and said driven member and including freely rotatable gears on said intermediate shafts and said driven member, power actuated clutches on said intermediate shafts and said driven member for connecting said freely rotatable gears thereto, a control device for said clutches comprising a plurality of movable control members each having two operative positions and each controlling two of said clutches, first means adjustable between a plurality of positions for selectively controlling movement of certain ones of said control members to effect engagement of at least one of said clutches at each of said positions for obtaining a predetermined spindle speed, and second means adjustable between a pair of positions for controlling movement of another one of said control members for providing each of said first-named positions with a pair of different spindle speeds.

10. A transmission as defined in claim 9 wherein said first means includes selector valve means indexible about an axis, said second means including spool valve means coaxially positioned relative to the selector valve means for adjustment along said axis relative to the selector valve means, and indexible with said selector valve means.

11. In a change speed transmission adapted to be used in a machine tool headstock having a power input shaft and a rotatable driven member such as a work spindle, a plurality of rotatable shafts intermediate said input shaft and said driven member, a gear train carried by said input shaft, said intermediate shafts and said driven member and including freely rotatable gears on said intermediate shafts and said driven member, power actuated clutches on said intermediate shafts and said driven member for connecting said freely rotatable gears thereto, a control device for said clutches comprising a plurality of movable control members each having two operative positions and each controlling two of said clutches, first means adjustable between a plurality of speed selecting positions for selectively controlling movement of certain ones of said control members to effect engagement of at least two of said clutches at each of said positions for establishing a predetermined speed of rotation of the spindle through the gear train, and second means adjustable between high speed, low speed and preselect positions for controlling movement of another one of said control members, said second means being effective when in the high speed position to control movement of said another one of said control members to engage one of the clutches controlled thereby for providing a high speed for each of said speed selecting positions, said second means being effective when in the low speed position to control movement of said another one of said control members to engage the other of the clutches controlled thereby for providing a low speed for each of said speed selecting positions, said second means being effective when in said preselect position to control movement of said another one of said control members to disengage both of the clutches controlled thereby so that the spindle cannot be driven through the gear train.

12. A transmission as defined in claim 11 wherein said first means is adjustable between a pair of positions other than said speed selecting positions, said first means being effective when in either position of said pair of positions to control movement of one control member of said certain ones to engage both of the clutches controlled thereby for permitting manual rotation of the spindle.

References Cited in the file of this patent

UNITED STATES PATENTS

| | | |
|---|---|---|
| 2,670,633 | Schoepe et al. | Mar. 2, 1954 |
| 2,701,477 | Schoepe | Feb. 8, 1955 |
| 2,712,140 | Curtis et al. | July 5, 1955 |